United States Patent [19]

Stober et al.

[11] Patent Number: 4,981,958

[45] Date of Patent: * Jan. 1, 1991

[54] METHOD FOR THE DRY CATIONIZATION OF STARCH II

[75] Inventors: Reinhard Stober, Hasselroth; Wolfgang Fischer, Kahl; Michael Huss, Eschborn; Reimund Pieter, Wetzlar, all of Fed. Rep. of Germany

[73] Assignee: Degussa Aktiengesellschaft, Frankfurt am Main, Fed. Rep. of Germany

[*] Notice: The portion of the term of this patent subsequent to Nov. 15, 2005 has been disclaimed.

[21] Appl. No.: 227,297

[22] Filed: Aug. 2, 1988

[30] Foreign Application Priority Data

Aug. 8, 1987 [DE] Fed. Rep. of Germany ....... 3726427

[51] Int. Cl.$^5$ ...................... C08B 31/08; C08B 31/12
[52] U.S. Cl. ..................................... 536/45; 536/102; 536/124; 536/126

[58] Field of Search ................. 536/45, 50, 102, 55.3, 536/124, 126, 50, 55.3

[56] References Cited

U.S. PATENT DOCUMENTS

| | | | |
|---|---|---|---|
| 3,346,563 | 10/1967 | Shildneck et al. ..................... | 536/50 |
| 4,281,109 | 7/1981 | Jarowenko et al. ................... | 536/50 |
| 4,332,935 | 6/1982 | Fischer et al. ......................... | 536/50 |
| 4,785,087 | 11/1988 | Stober et al. .......................... | 536/111 |

FOREIGN PATENT DOCUMENTS 2063282 8/1978 United Kingdom ................. 536/50

*Primary Examiner*—Merrell C. Cashion, Jr.
*Assistant Examiner*—C. Azpuru
*Attorney, Agent, or Firm*—Beveridge, DeGrandi & Weilacher

[57] ABSTRACT

A method for the dry cationization of starch is disclosed by means of reaction with alkylene epoxides in an alkaline medium in the presence of water.

13 Claims, No Drawings

METHOD FOR THE DRY CATIONIZATION OF STARCH II

INTRODUCTION AND BACKGROUND

The present invention relates to a dry method of preparing cationic starch ethers by reacting starch with alkylene epoxides in the presence of water in an alkaline medium.

The reaction of starch or of substances containing starch in so-called dry methods with cationic etherification agents is known. In these methods the reaction is not carried out in an aqueous suspension but rather with a starch which appears dry on the surface. According to U.S. Pat. No. 4,127,563, alkylene halohydrines are used for the cationization at a pH of less than or equal to 9 and a temperature of 25° to 60° C.

The reaction of a halohydrin with starch in an alkaline medium but at a temperature which is at least 30° C. under the gelation temperature of starch is claimed in U.S. Pat. No. 3,346,563.

European Patent 0,031,477 likewise teaches a method of reacting starch with alkylene epoxides which is carried out in the presence of water, calcium hydroxide or calcium oxide at temperatures of 50° to 120° C.

A method for the cationization of starch is shown in DE-OS 29 35 338 in which, however, the excess alkali must be neutralized.

U.S. Pat. No. 4,281,109 recommends mixing the etherification reagent and the alkali or alkaline earth hydroxide in advance and only then compounding them with the starch.

This procedure is intended to achieve a more even and more rapid intermixing of the reagents so that, for example, local accumulations of alkali do not occur which can result in a swelling of the starch.

All methods cited from the prior art share the common feature that the reaction mixture must be constantly mixed until the conclusion of the etherification reaction.

As the temperature decreases, the reaction time increases. The reaction containers are blocked for a correspondingly long time and agitating energy must be expended.

In addition, yield losses must be accepted.

SUMMARY OF THE INVENTION

Accordingly, an object of the present invention is to provide a method for the preparation of cationic starch ethers in which, in spite of low reaction temperatures, only very little agitation energy is required, reaction containers are blocked only briefly and very good yields are obtained. In addition, no sieving is necessary.

In achieving the above and other objects, one feature of the invention is a method for the dry cationization of starch carried out by reacting starch with alkylene epoxides in an alkaline medium in the presence of water, characterized in that the reaction is carried out at 5° to 40° C., in the presence of a fine, hydrophilic silica and alkali silicates and/or alkali aluminates or of a mixture of alkali or alkaline earth hydroxides or oxides and alkali carbonates or of a mixture of one or more of these hydroxides, oxides or carbonates with an alkali silicate and/or alkali aluminate. The pH of a starch prepared in this manner is greater than 9 (1% by weight suspension).

DETAILED DESCRIPTION OF INVENTION

According to the invention, the following procedure is used: The mixture of starch, the aforesaid alkaline acting substances, silica and alkylene epoxide, which is generally added as an aqueous solution, is homogenized in an intensive, high-efficiency mixer. The resulting product is then removed and the cationization reaction is allowed to progress to its end in the provided storage container such as, for example, a silo, or the reaction can also be completed in packages provided for shipment.

Then, further mixing energy does not have to be expended for further method steps.

In addition, it has proven to be advantageous if the reaction is preferably performed in a temperature range in which the room temperature of customary manufacturing facilities may fluctuate as a function of the season; that is, from 18° to 30° C. especially 20° to 25° C.

Tests have shown that the epoxide used for purposes of the invention reacts completely. At a temperature of 20° C., only traces of less than 10 ppm epoxide/kg starch can be determined after 7 days.

Starches prepared according to the method of the invention comprise no coarse portion and can be used without after treatment, such as sieving.

Suitable conventional intensive mixers can be used for purposes of the invention, such as plowshare mixers (continuous and discontinuous) and humidifying flow mixers (continuous).

Native or modified starch or starch containing substances of any conventional origin can be used for preparing cationic starch ethers according to the method of the invention. Native wheat, corn, tapioca or potato starch is used with particular advantage. Therefore, as used herein, the term "starch" includes any suitable source of starch.

According to the invention the etherification of the starch is performed with alkylene epoxides of the general formula:

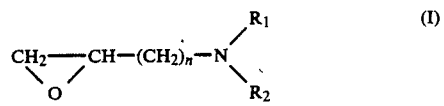 (I)

or preferably

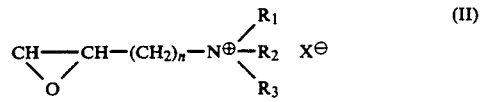 (II)

in which n represents a number of 1,2 or 3, $R_1$, $R_2$ and $R_3$ are the same or different alkyl groups with 1 to 4 carbon atoms or $R_1$ represents the benzyl group and $X^{\ominus}$ signifies chloride, bromide, sulfate or acetate, but preferably chloride.

There is employed according to the invention, 0.005 to 0.500 mole epoxide according to formulas (I) or (II), preferably 0.01 to 0.25 mole epoxide per mole starch, calculated as anhydroglucose units in the dry state. A degree of substitution (DS) of 0.005 to 0.300, preferably 0.01 to 0.20, results therefrom.

According to the invention the etherification of the starch with the alkylene epoxides is performed in a medium which contains 10 to 35% by weight, preferably 20 to 25% by wt. water and 0.2 to 4.0% by wt., preferably 0.4 to 3.0% by wt. of an alkali metal silicate and/or alkali metal aluminate. Mixtures of alkali metal or alkaline earth metal hydroxides or oxides and alkali metal carbonates can also be used.

Mixtures of one or more of these oxides, hydroxides or carbonates with an alkali metal silicate and/or aluminate are likewise suitable.

As used herein, the term "alkali metal" denotes in particular sodium or potassium; and the term "alkaline earth metal" denotes in particular calcium. Sodium metasilicate is used in particular as the silicate.

In addition to these components, 0.01 to 2.0% by wt., preferably 0.1 to 1.0% by wt. of a fine, hydrophilic silica must be present in the reaction mixture in relation to its total amount. This can be silicas which are precipitated or which are produced by flame hydrolysis. These materials are well known in the art.

The specific surface areas of the silicas suitable for purposes of the invention are between 60 and 700 m$^2$/g preferably 100 and 450 m$^2$/g (BET measurement according to DIN 6 131, N2 adsorption at the temperature of liquid nitrogen, previous heating [annealing, curing] of the specimen at 110° C.).

It is preferable to use hydrophilic, precipitated silicas with a specific surface area of 190 to 450 m$^2$/g especially a spray-dried, precipitated silica with a specific surface area of 190 m$^2$/g (BET measurement).

It is preferable to use a powdery mixture of silica and the aforesaid alkaline acting substances, especially alkali metal silicate and/or alkali metal aluminate (called activator in the following text).

The activator contains 2 to 50% by wt., preferably 10 to 40% by wt. silica. The difference between that and from 100% is taken up by the aforesaid alkaline acting substances.

It must be taken into consideration thereby that the activator must be present as powder and in each instance the amount of activator is used which results in a final product with a pH of greater than 9 (1% by wt. starch suspension), especially 10 -11.2.

The sequence when mixing the reagents is generally not considered to be critical and can be varied.

However, it has proven to be advantageous to first mix starch and activator with each other (batch mixer) for a period of time up to 10 minutes and then to spray the epoxide in the form of an aqueous solution onto the resulting mixture.

The mixture which accumulates during the preparation of the epoxide by means of reacting the corresponding halogen hydrin with alkaline acting substances such as e.g. alkali metal hydroxide can be used immediately if the alkali metal halogenide which is produced thereby causes no problems in the final product (danger of corrosion). The latter is neither washed nor neutralized and can be used directly.

The neutralization customary in the state of the art and a washing out of the alkaline acting component in the cationized starch can of course also be performed if desired when considering the intended use of the starch. Highly substituted starches which are soluble in cold water and with a degree of substitution of 0.08 to 0.30 can also be prepared in accordance with the present invention.

If the process is being carried out at room or ambient temperature, no temperature control is necessary either for the mixing device or for the reaction to completion. The desired products are nevertheless obtained in high yields.

Additional reaction vessels are then even unnecessary since the reaction mixture can be filled after the intensive mixing into suitable packages provided for shipment or into a storage silo where it reacts to completion.

The short dwell time in the mixing unit makes it possible to carry out the dry cationization in a continuous manner, whereas according to the state of the art only a batchwise cationization of starch was known and logical due to the long mixing times.

The cationized starches which can be prepared in accordance with the present invention have many uses and are suitable for example as auxiliary retention aids, as additives to the mass in the manufacture of paper for improving the paper strength, in the glue press in the manufacture of paper, as thickening agents, as flocculating agents for waste-water treatment and in the production of gypsum.

The following examples serve to illustrate the present invention.

The following activator types for the cationization of starches by means of intensive mixing are prepared:

The composition of the metasilicate is:

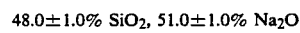
48.0±1.0% SiO$_2$, 51.0±1.0% Na$_2$O (Henkel KGaA, anhydrous sodium metasilicate) and that of the aluminate:

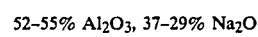
52-55% Al$_2$O$_3$, 37-29% Na$_2$O (Dynamit Nobel AG, ""Dynaflock" sodium aluminate")

TABLE 1

| Type | Activator mixtures Composition (% by weight) | |
|---|---|---|
| PC #1 | 76.85% | sodium metasilicate |
| | 23.15% | KS (spray-dried silica 190 m$^2$/g) |
| PC #2 | 44.90% | sodium metasilicate |
| | 27.78% | calcium hydroxide |
| | 27.32% | silica |
| PC #3 | 48.81% | calcium hydroxide |
| | 34.13% | sodium carbonate |
| | 17.96% | silica |
| PC #4 | 79.25% | sodium aluminate |
| | 20.75% | silica |
| PC #5 | 38.31% | sodium metasilicate |
| | 43.60% | sodium aluminate |
| | 18.09% | silica |
| PC #6 | 51.45% | sodium aluminate |
| | 27.20% | calcium hydroxide |
| | 21.35% | silica |
| PC #7 | 63.00% | sodium metasilicate |
| | 37.00% | silica. |

EXAMPLES

Generally applicable data:

1000 g (5.230 moles) native potato starch (moisture content 15.2% content of insoluble nitrogen 0.010%) were intensively mixed in a plowshare mixer each instance for 5 minutes with the indicated activator and the reagent solution, which contained 25.38 g (corresponding to a theoretical DS of 0.032) 2,3-epoxypropyl-trimethyl ammonium chloride in each instance, was added dropwise within 1 minute while the mixer was running. (Nr. 7: The reagent solution contained 158.61 g reagent, corresponding to a theoretical DS of 0.200.)

After a further 15 minutes of mixing, the reaction material was packed into polyethylene sacks and analyzed after 2 days storage.

Mixing and storage were performed at room temperature (20° C.).

The yield and the degree of substitution (DS) were determined by nitrogen determination according to Kjeldahl on the washed-out product.

Wash solution: Iso-propanol/water (60:40% by wt).

TABLE 2

| Nr. | Activator Type | Activator Amount | Reagent solution Amount | pract. DS | Yield |
|---|---|---|---|---|---|
| 1 | PC #1 | 18.32 g | 158.84 g | 0.0275 | 85.9% |
| 2 | PC #2 | 15.52 g | 157.96 g | 0.0283 | 88.4% |
| 3 | PC #3 | 24.85 g | 160.90 g | 0.0214 | 66.9% |
| 4 | PC #4 | 20.44 g | 159.51 g | 0.0279 | 87.2% |
| 5 | PC #5 | 20.35 g | 158.90 g | 0.0288 | 90.0% |
| 6 | PC #6 | 17.47 g | 158.02 g | 0.0279 | 87.2% |
| 7 | PC #7 | 34.42 g | 374.47 g | 0.1630 | 81.5% |

Viscosities according to Brabender (Literature: W. C. Shneg, K. H. Tipples: "The Amylograph Handbook", The American Association of Cereal Chemists St. Paul 1980 ISBN: 0-913250-15-5)

The viscosity charts were recorded 1 week after mixing.

Device: Brabender viscograph E
Paste concentration: 5.0% by wt.
Initial temperature: 25° C.
Heating rate: 3 degrees/min.
1st holding temperature: 95° C.
1st holding time: 30 min.
Cooling rate: 3 degrees/min.
2nd holding temperature: 50° C.
2nd holding time: 30 min.

TABLE 3

| | (Values in Brabender units) | | |
|---|---|---|---|
| No. | Peak | 95° C. 30 min. | 50° C. 30 min. |
| 1 | 865 | 312 | 430 |
| 2 | 675 | 220 | 305 |
| 3 | 669 | 185 | 252 |
| 4 | 830 | 270 | 359 |
| 5 | 860 | 321 | 408 |
| 6 | 779 | 188 | 240 |
| 7 | soluble in cold water | | |

In the claims:

1. A method for the dry cationization of starch comprising reacting a starch with an alkylene epoxide in an alkaline medium in the presence of water, at a temperature of 5° to 40° C. in the presence of a fine, hydrophilic silica and a member of the group consisting of alkali metal silicates, alkali metal aluminates, alkali metal or alkaline earth metal hydroxides or oxides, alkali metal carbonates, and mixture thereof.

2. The method according to claim 1, further comprising homogenizing the starch in an intensive mixing zone within 10 seconds to 25 minutes, removing the so homogenized reaction mixture and permitting the reaction to go to completion in a storage container.

3. The method according to claim 1, wherein the temperature is from 18° to 30° C.

4. The method according to claim 1, wherein the alkylene epoxide is represented by the formula:

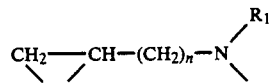

or

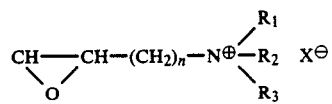

wherein n is an integer of 1, 2 or 3,
$R_1$, $R_2$ and $R_3$ are the same or different alkyl from 1 to 4 carbons, or $R_1$, is benzyl, $X^\ominus$ is chloride, bromide, sulfate or acetate.

5. The method according to claim 1, wherein 0.0005 to 0.5 mole epoxide are used per mole of starch.

6. The method according to claim 1, wherein the reaction is carried out in a medium containing 10 to 35% by weight water.

7. The method according to claim 1, wherein the amount of said member is 0.2 to 4.0% by weight.

8. The method according to claim 1, wherein the silica has a specified surface area of between 60 and 700 $m^2$/g BET.

9. The method according to claim 8, wherein the silica is a precipitated silica with a specific surface area of 190 to 450 $m^2$/g.

10. The method according to claim 1, wherein said silica and said member are added as an activator powder mixture containing 2 to 50% by weight of silica.

11. The method according to claim 1, wherein the pH of the final product is greater than 9.

12. A method for the dry cationization of starch comprising
mixing starch with a powdered activator mixture, said activator mixture being formed of fine, hydrophilic silica and an alkaline substance being a member of the group consisting of alkali metal silicates, alkali metal aluminates, alkali metal or alkaline earth metal hydroxides or oxides, alkali metal carbonates, and mixture thereof,
and thereafter spraying said starch and activator with an aqueous solution of an alkylene epoxide, and reacting at a temperature of 5° to 40° C.

13. The method according to claim 12, further comprising homogenizing in an intensive mixing zone within 10 seconds to 25 minutes, then removing and allowing reaction to completion.

* * * * *